United States Patent
Kawasaki et al.

(10) Patent No.: US 8,385,601 B2
(45) Date of Patent: Feb. 26, 2013

(54) IN-VEHICLE WHITE LINE RECOGNITION APPARATUS

(75) Inventors: Naoki Kawasaki, Kariya (JP); Tetsuya Takafuji, Anjo (JP); Kazuma Hashimoto, Nukata-gun (JP); Shunsuke Suzuki, Anjo (JP)

(73) Assignees: Nippon Soken, Inc., Nishio-shi (JP); Denso Corporation, Kariya (JP)

( * ) Notice: Subject to any disclaimer, the term of this patent is extended or adjusted under 35 U.S.C. 154(b) by 228 days.

(21) Appl. No.: 12/932,812

(22) Filed: Mar. 7, 2011

(65) Prior Publication Data

US 2011/0216944 A1    Sep. 8, 2011

(30) Foreign Application Priority Data

Mar. 8, 2010  (JP) .................................. 2010-50490

(51) Int. Cl.
*G06K 9/00*  (2006.01)
*H04N 7/18*  (2006.01)

(52) U.S. Cl. ..................... 382/104; 382/274; 348/148

(58) Field of Classification Search .............. 382/100, 382/103–107, 155, 162, 168, 170, 173, 181, 382/190, 199, 232, 254, 274, 276, 286–287, 382/305, 312; 348/148, 149; 701/28
See application file for complete search history.

(56) References Cited

U.S. PATENT DOCUMENTS

| | | | | |
|---|---|---|---|---|
| 5,922,036 A * | 7/1999 | Yasui et al. | .................. | 701/28 |
| 6,925,206 B2 * | 8/2005 | Akutagawa | .................. | 382/173 |
| 7,346,190 B2 * | 3/2008 | Taniguchi et al. | .................. | 382/104 |
| 8,180,110 B2 * | 5/2012 | Kageyama et al. | .................. | 382/104 |
| 8,208,021 B2 * | 6/2012 | Unoura | .................. | 348/148 |
| 2003/0026456 A1 | 2/2003 | Akutagawa | | |
| 2003/0072471 A1 | 4/2003 | Otsuka et al. | | |
| 2008/0192984 A1 | 8/2008 | Higuchi et al. | | |
| 2008/0291276 A1 | 11/2008 | Randler | | |
| 2010/0121569 A1 | 5/2010 | Nakamura et al. | | |

FOREIGN PATENT DOCUMENTS

| | | |
|---|---|---|
| JP | 7-311895 | 11/1995 |
| JP | 7-319541 | 12/1995 |
| JP | 8-320998 | 12/1996 |
| JP | 11-70884 | 3/1999 |
| JP | 11-296799 | 10/1999 |
| JP | 2001-236506 | 8/2001 |
| JP | 2003-51017 | 2/2003 |

(Continued)

OTHER PUBLICATIONS

Office Action dated Jun. 21, 2012 in corresponding German Application No. 10-2011-001037.8 with English translation.

(Continued)

*Primary Examiner* — Seyed Azarian
(74) *Attorney, Agent, or Firm* — Harness, Dickey & Pierce, PLC (57) ABSTRACT

An in-vehicle white line recognition apparatus is disclosed. Form an image captured by a camera, the apparatus extracts multiple white line candidates including a first white line candidate and a second white line candidate. The apparatus calculates a certainty factor of each white line candidate, the certainty factor indicating a degree of certainty that the each white line candidate represents the white line. When the first and second white line candidates are within a predetermined range and when a ratio of contrast of the first white line candidate to that of the second white line candidate is less than a predetermined value, the apparatus decreases the certainty factor of the first white line candidate.

1 Claim, 4 Drawing Sheets

FOREIGN PATENT DOCUMENTS

| | | |
|---|---|---|
| JP | 2003-61087 | 2/2003 |
| JP | 2003-67755 | 3/2003 |
| JP | 2003-123058 | 4/2003 |
| JP | 2004-178610 | 6/2004 |
| JP | 2005-18148 | 1/2005 |
| JP | 2005-332268 | 12/2005 |
| JP | 2007-114839 | 5/2007 |
| JP | 2007-220013 | 8/2007 |
| JP | 2008-102684 | 5/2008 |
| JP | 2008-197863 | 8/2008 |
| JP | 2008-293380 | 12/2008 |
| JP | 2009-211715 | 9/2009 |

OTHER PUBLICATIONS

Office Action mailed Jul. 24, 2012 in corresponding Japanese Application No. 2010-50490 with English translation.

Office action dated Feb. 28, 2012 in corresponding Japanese Application No. 2010-050490.

* cited by examiner

CONTRAST RATIO BETWEEN WHITE LINE CANDIDATES

FIG. 5

CONTRAST RATIO OF WHITE LINE CANDIDATE

CANDIDATE CORRESPONDING TO TRUE WHITE LINE (STRONG CONTRAST)

CANDIDATE CORRESPONDING TO SHADOW (WEAK CONTRAST)

FIG. 8

CANDIDATE CORRESPONDING TO ERASED LINE TRACE (WEAK CONTRAST)

CANDIDATE CORRESPONDING TO TRUE WHITE LINE (STRONG CONTRAST)

FIG. 9

CANDIDATE CORRESPONDING TO TRUE WHITE LINE (WEAK CONTRAST)

CANDIDATE CORRESPONDING TO TRUE WHITE LINE (STRONG CONTRAST)

ably, in some places. For this reason, when the ratio of contrast is not less than 150%, the certainty factor of the white line candidate is increased. How-

IN-VEHICLE WHITE LINE RECOGNITION APPARATUS

CROSS REFERENCE TO RELATED APPLICATION

The present application is based on and claims priority to Japanese Patent Application No. 2010-50490 filed on Mar. 8, 2010, disclosure of which is incorporated herein by reference.

BACKGROUND OF THE INVENTION

1. Field of the Invention

The present invention relates to an in-vehicle white line recognition apparatus that recognizes a white line on a road for drive assistance.

2. Description of Related Art

An in-vehicle white line apparatus recognizes a white line on a road and is used in a lane departure warning apparatus to assist a driver in driving a vehicle (see Patent Document 1).

The lane departure warning apparatus includes an on-board camera for capturing an image of surroundings of the vehicle, an image processing unit for performing processing on the image, and a warning generation unit for generating a warning. The image processing unit detects or estimates a white line from the image captured by the on-board camera. The warning generation unit calculates a distance from the vehicle to a left side white line and a distance from the vehicle to a right side white line. When one of the distances is less than or equal to a threshold, i.e., when the vehicle approaches within the threshold from one of the distances, the warning generation unit gives a warning to a driver of the vehicle. In the following, the vehicle equipped with the lane departure warning apparatus is also called a subject vehicle.

A largest problem with the lane departure warning apparatus may be white line wrong detection caused by various noises. Noise sources include, for example, a dirty mark on a road surface, a paint on a road, a light reflected from a puddle etc. on a road surface, a shadow of the subject vehicle, a shadow of a vehicle in rear of the subject vehicle, and the like.

Various techniques or methods to suppress theses noises and extract only a true white line have been proposed. For example, a method may include extracting white line candidates from an image captured by an on-board camera by using an image recognition technique, calculating certainty factors of respective white line candidates, and selecting a white line candidate having a largest certainty factor. In Patent Document 1, a certainty factor is calculated from brightness contrast between a white line candidate and its surroundings etc.

Patent Document 1: JP-2005-18148A

According to the method of calculating the certainty factor only from, the brightness contrast between a white line candidate and its surroundings, however, it is difficult to eliminate a possibility of wrong detection of an erased line trace (i.e., an white line that has been erased while a visible trace is being left) and the like in some cases. This will be more specifically described below.

Although a typical ratio of contrast between a white line and a road surface is approximately 400%, the ratio of contrast can be approximately 150% in some places. For this reason, when the ratio of contrast is not less than 150%, the certainty factor of the white line candidate is increased. However, a ratio of contrast between the erased line trace and the road surface can be approximately 160% in some cases. If the certainty factor of the erased line trace is increased, then the erased line trace is misidentified as a white line.

SUMMARY OF THE INVENTION

The present invention is made in view of the foregoing points. It is an objective of the present invention to provide an in-vehicle white line recognition apparatus that can distinguish an erased line trace etc. from a true white line.

According to an aspect of the present invention, an in-vehicle white line recognition apparatus for recognizing a white line includes: an on-board camera configured to capture an image of a surrounding of a vehicle; a white line candidate extraction section configured to perform image processing on the captured image to extract multiple white line candidates from the captured image, the multiple white line candidates including a first white line candidate and a second white line candidate; at lease one certainty factor calculation section configured to calculate a certainty factor of each white line candidate, the certainty factor indicating a degree of certainty that the each white line candidate represents the white line; and a white line selection section configured to select the white line to be recognized, based on the calculated certainty factors. When the first white line candidate and the second white line candidate satisfy a predetermined condition that (i) the first white line candidate and the second white line candidate are within a predetermined range and (ii) a ratio of contrast of the first white line candidate to that of the second white line candidate is less than a predetermined value, the certainty factor calculation section decreases the certainty factor of the first white line candidate as compared with when the first white line candidate and the second white line candidate do not satisfy the predetermined condition.

According to the above in-vehicle white line recognition apparatus, when an erased line trace exists in the vicinity of a true white line and when a ratio of contrast of the erased line trace to that of the true white line is less than or equal to the predetermined value for instance, the in-vehicle white line recognition apparatus can decrease the certainty factor of the white line candidate corresponding to the erased line trace, and can prevent the erased line trace from being misidentified as a true white line.

In another case where two true white lines are adjacently located and the ratio of contrast between the two white lines exceeds the predetermined value, the in-vehicle white line recognition apparatus can correctly recognize them without decreasing the certainty factors of them.

In yet another case where two true white lines have a large distance therebetween and are not within the predetermined range, the in-vehicle white line recognition apparatus can correctly recognize them without decreasing the certainty factors of them even if the ratio of contrast between the two true white lines is less than or equal to the predetermined value.

The above in-vehicle white line recognition apparatus may be configured in the following way. The at least one certainty factor calculation section is multiple certainty factor calculation sections each calculating the certainty factor. The white line selection section calculates a likelihood of each white line candidate through multiplication of the certainty factors that are respectively calculated for the each white line candidate by the multiple certainty factor calculation sections. The white line selection section selects one white line candidate having a largest likelihood from the multiple white line candidates.

According to the above configuration, regardless of the type of each certainty factor calculation section, the in-vehicle white line recognition apparatus can combine the certainty factor calculation sections to obtain the likelihood, and can selects the white line candidate based on the likelihood. Therefore, even if an existing certainty factor calculation section is improved or another certainty factor calculation section is newly added, it is possible to easily combine multiple processes of respective certainty factor calculation sections.

The above in-vehicle white line recognition apparatus may be configured in the following way. One of the multiple certainty factor calculation sections is configured to calculate the certainty factor of each white line candidate, based on a ratio of contrast of the each white line candidate with respect to a road, the road excluding a portion of the road corresponding to the each white line candidate.

According to this configuration, even if a white line candidate corresponding to an erased trace etc. is spaced apart from another white line candidate by a large distance (e.g., a distance larger than the predetermined value), the certainty factor of the white line candidate corresponding to the erased trace etc. can be decreased.

For example, the first white line candidate and the second white line candidate existing within the predetermined range may mean that a distance between the first white line candidate and the second white line candidate is less than or equal to a predetermined distance value. The predetermined distance value may be set so that an erased line etc. is excluded from recognition of a white line and a true white line is not excluded from recognition of a white line. When a longitudinal direction of the first line candidate is parallel to that of the second line candidate, the distance between the first white line candidate and the second white line candidate may be a distance therebetween in a direction perpendicular to the longitudinal direction. When a longitudinal direction of the first line candidate is not parallel to that of the second line candidate, the distance between the first white line candidate and the second white line candidate may be a shortest distance or an average distance therebetween.

The above in-vehicle white line recognition apparatus is applicable to, for example, a lane departure warning apparatus. Based on the white line recognized by the white line recognition apparatus, the lane departure warning apparatus may calculate a distance from the vehicle to a right side white line and a distance from the vehicle to a left side white line. When one of the distances is less than or equal to a threshold, i.e., when the vehicle approaches within the threshold from the white line, the lane departure warning apparatus may give a warning to a driver.

In addition, based on a pair of parallel white lines recognized by the in-vehicle white line recognition apparatus, it is possible to calculate a focus of expansion (FOE), and it is possible to use the FOE to recognize a pedestrian and the like.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF EMBODIMENTS

Embodiments of the present invention will be described below with reference to the accompanying drawings.

1. Configuration and Operation of in-Vehicle White Line Recognition Apparatus

Figure 1:
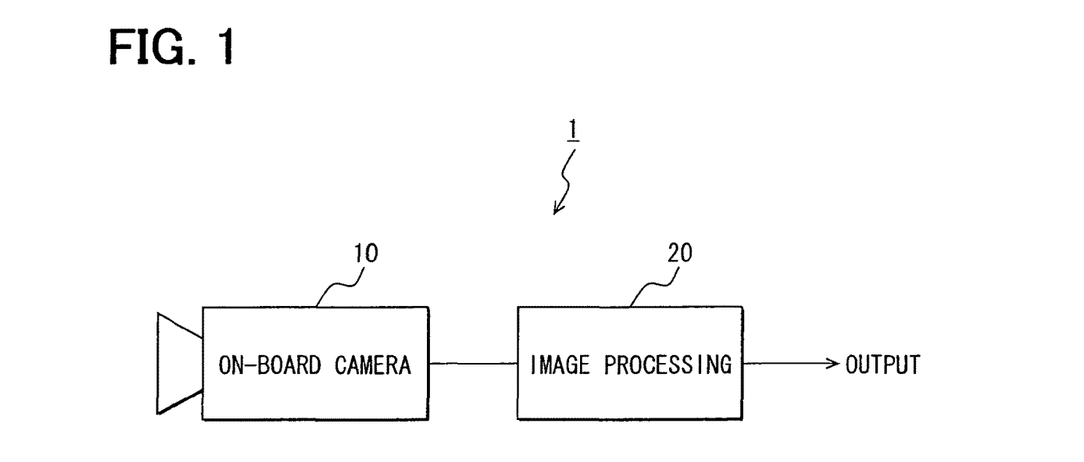
FIG. 1 is a functional block diagram illustrating an in-vehicle white line recognition apparatus.
Figure 2:
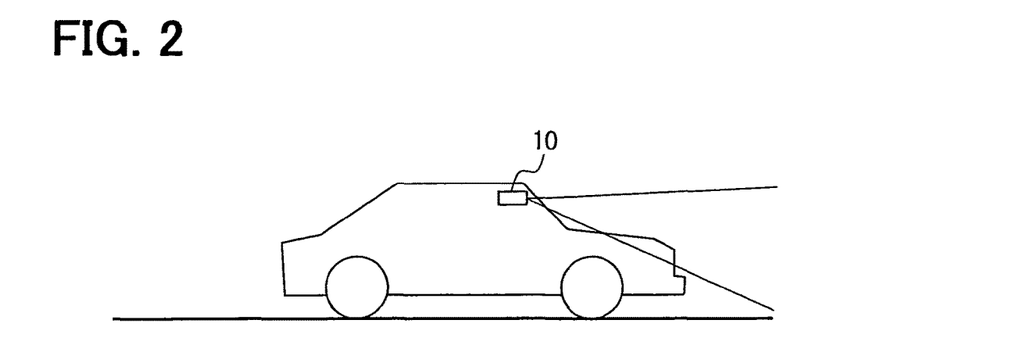
FIG. 2 is a diagram illustrating position of on-board camera in a vehicle.
Figure 3:
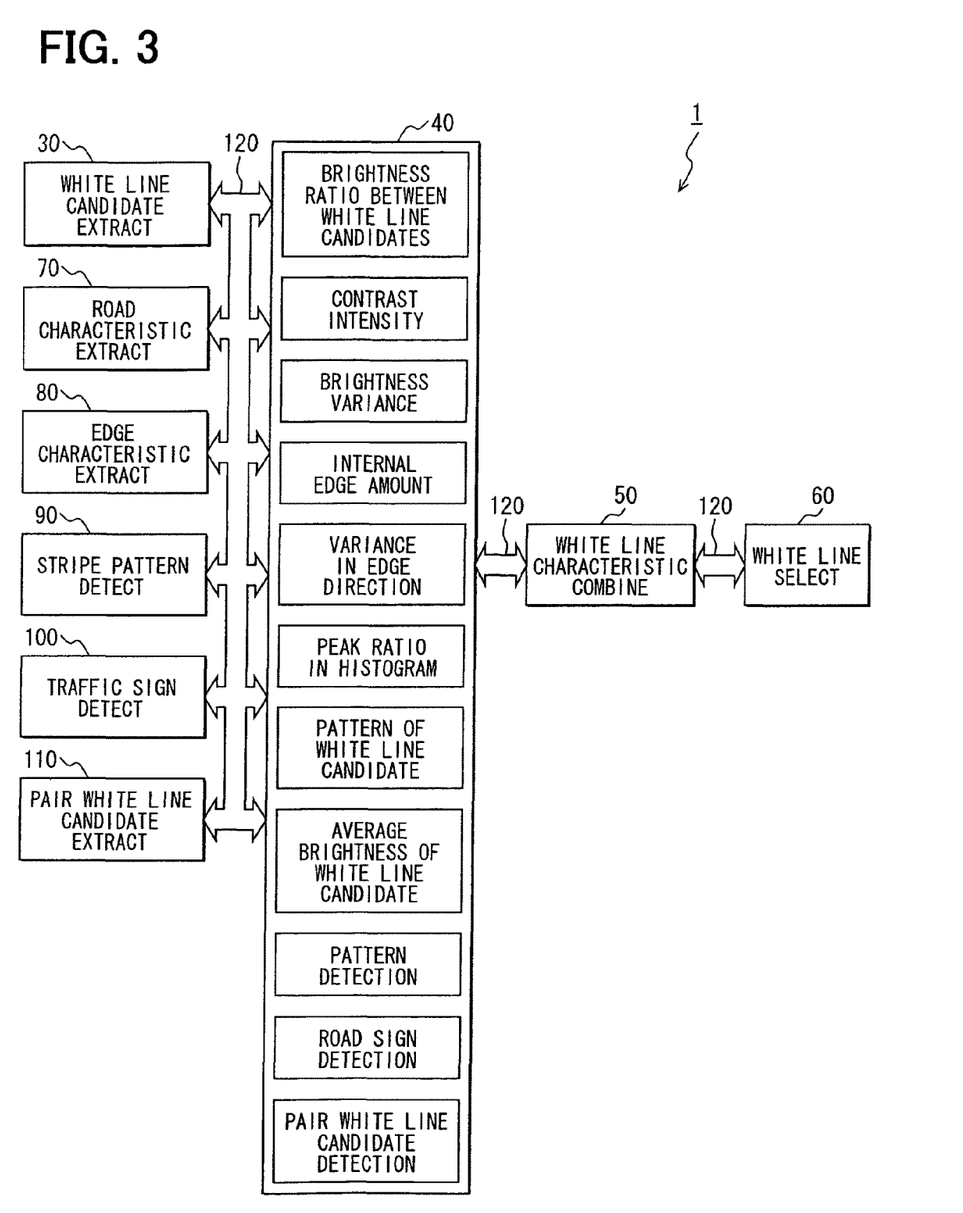
FIG. 3 is a functional block diagram illustrating an image processing unit.
Figure 4:
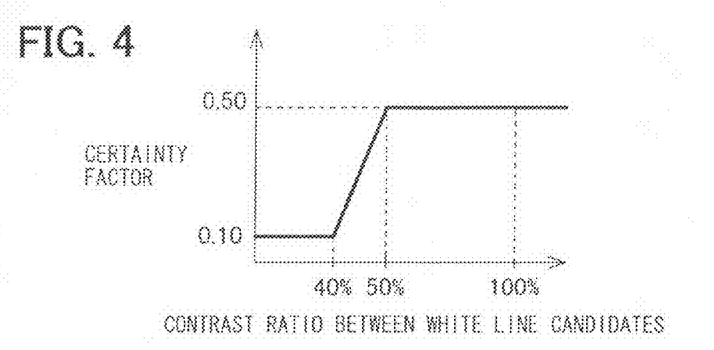
FIG. 4 is a graph illustrating a certainty factor setting condition.
Figure 5:
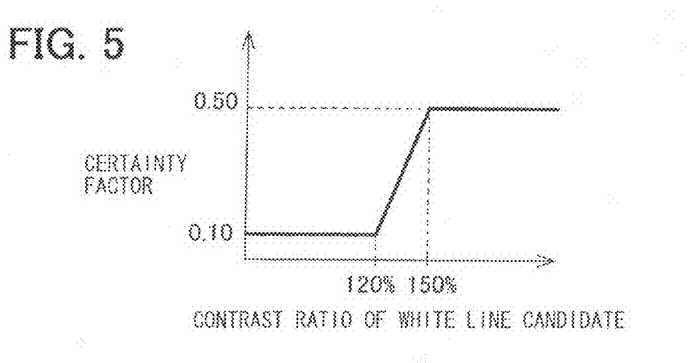
FIG. 5 is a graph illustrating another certainty factor setting condition.

With reference to FIGS. 1 to 5, an in-vehicle white line recognition apparatus 1 will be described in relation to its configuration and operation. FIG. 1 is a block diagram illustrating an in-vehicle white line recognition apparatus 1. FIG. 2 is a diagram illustrating position of an on-board camera 10 in a vehicle. FIG. 3 is a functional block diagram illustrating an image processing unit 20. FIGS. 4 and 5 are graphs illustrating certainty factor setting conditions.

As shown in FIG. 1, the in-vehicle white line recognition apparatus 1 includes an on-board camera 10 for capturing an image of surroundings of the vehicle and an image processing unit 20 for performing image processing on the image captured by the on-board camera 10.

As shown in FIG. 3, the image processing unit 20 includes a DSP (digital signal processor) 30, a DSP 40, a DSP 50, a DSP 60, a DSP 70, a DSP 80, a DSP 90, a DSP 100, a DSP 110, a bus 120 for data transmission between the DSPs 30 to 110, a ROM (read-only memory, not shown), a RAM (random access memory, not shown), and an I/O (an input/output port, not shown).

The DSP 30 performs image processing to extract one or more white line candidates on a road from the image captured by the on-board camera 10. The DSP 30 is also referred to hereinafter as a white line candidate extraction portion 30.

Specifically, from the image captured by the on-board camera 10, the white line candidate extraction portion 30 extracts a white-line-like object on a road by using pattern matching, the number of votes in straight line extraction Hough transform technique (e.g., a result of a solid line/broken line determination). In the present disclosure, a white-line-like object is also referred to as a white line candidate. From one frame image, one or more white line candidates may be extracted.

The DSP 40 calculates a certainty factor of a white line candidate extracted by the white line candidate extraction portion 30. The certainty factor indicates a degree of certainty that the white line candidate represents a true white line. This degree of certainty is called a degree of white line resemblance. The DSP 40 is also referred to as a white line characteristic calculation portion 40. The certainty factor is numerical value (e.g., likelihood) settable within in a range between 0.01 and 1. In each of the below-described first to ninth processes (1) to (9), the white line characteristic calculation portion 40 calculates or sets the certainty factor. For one white line candidate, multiple certainty factors are calculated or set because of the first to ninth processes (1) to (9). The first to ninth processes (1) to (9) performed by the white line characteristic calculation portion 40 are as follows.

(1) A first process will be described. It is assumed that the white line candidate extraction portion 30 extracts multiple white line candidates including a first white line candidate and a second white line candidate. The white line characteristic calculation portion 40 decreases a certainty factor of the first white line candidate when the first and second white line candidates satisfy a predetermined condition that the first and second white line candidates are within a predetermined range and a ratio of contrast of the first white line candidate to the second white line candidate is less than or equal to a predetermined value of, for example, 50%. In the present disclosure, a ratio of contrast of one white line candidate to that of another white line candidate is also referred to as a contrast ratio between white line candidates. For example, the certainty factor may be set in such a manner as illustrated in FIG. 4. FIG. 4 is a graph showing the certainty factor as a function of the ratio of contrast between white line candidates. When the ratio of contrast between white line candidates exceeds 50%, the certainty factor is constant at 0.50. When the ratio of contrast between white line candidates is in a range between 40% and 50%, the certainty factor increases (e.g., proportionately) as the ratio of contrast between white line candidates increases. When the ratio of contrast between white line candidates is less than or equal to 40%, the certainty factor is constant at 0.10.

Satisfaction of the above-described predetermined condition requires that the ratio of contrast between white line candidates is less than or equal to the predetermined value (e.g., 50%). Thus, the certainty factor upon satisfaction of the predetermined condition is set less than 0.50. The first and second white line candidates do not satisfy the above-described predetermined condition if the ratio of contrast between white line candidates is greater than the predetermined value or if a distance between the first and second white line candidates is larger than a threshold. Thus, the certainty factor upon un-satisfaction of the predetermined condition is set to 0.50.

In some cases, an erased line trace etc. on a road may exist in the vicinity of a true white line, and the erased line trace etc. may be extracted as a white line candidate. When the contrast of the erased line trace etc. is large, it is difficult to distinguish the erased line trace from a true white line based on only the contrast.

However, the inventors of the present application have found out that it is possible to determine that the erased line trace etc. is not a true white line, if a white line candidate exists in the vicinity of the erased line trace etc. and if the contrast of the white line candidate much higher than (e.g., two times or more as large as) that of the erased line trace etc. The first process uses the above idea and decreases the certainty factor of a white line candidate that highly likely represents an erased line trace etc.

(2) A second process will be described below. In the second process, a certainty factor is calculated based on a ratio of contrast of a white line candidate with respect to a road surface surrounding the white line candidate (except a portion of the road surface corresponding to the white line candidate). In the present disclosure, the ratio of contrast of a white line candidate with respect to a road surface surrounding the white line candidate is called a contrast ratio of a white line candidate itself.

For example, as shown in FIG. 5, when the contrast ratio of a white line candidate itself is less than 150%, the certainty factor is decreased. In FIG. 5, the horizontal axis shows the contrast ratio of a white line candidate itself, and the vertical axis shows the certainty factor calculated or set as a function of the contrast ratio of a white line candidate itself.

(3) A third process will be described. The third process uses, as a characteristic indicating a degree of white line resemblance, a brightness dispersion or an edge amount inside a white line candidate extracted by the white line candidate extraction portion 30.

A typical white line has a white color and diffusely reflects a light irradiated from headlights of a vehicle or a street lamp. Thus, a white line typically has larger brightness dispersion than the road surface. Magnitude of the internal edge amount in a certain area indicates flatness of the certain area. A large flatness corresponds to a less edge part in the area. Thus, a smaller internal edge amount corresponds to a large flatness, and a large internal edge amount corresponds to a small flatness. Since a white line typically has a large flatness than a road surface, the white line has a smaller internal edge amount than the road surface.

For this reason, the white line characteristic calculation portion 40 calculates the internal brightness dispersion or the internal edge amount of a white line candidate, and sets the certainty factor in accordance with the calculated internal brightness dispersion or the calculated internal edge amount so that the certainty factor is larger as the internal brightness dispersion is larger, or the certainty factor is larger as the internal edge amount is smaller. Then, the white line characteristic calculation portion 40 outputs the calculated certainty factor.

(4) A fourth process will be described. The fourth process uses a variance in an edge direction of a white line candidate, a peak ratio or a peak magnitude in a histogram in the edge direction of a white line candidate as a characteristic indicating a degree of white line resemblance.

Since a white line is painted on a road to extend in one direction, the white line has a larger variance in an edge direction than the road surface. Noted that even when a road is curved, the road typically has a small curvature, and thus, it is possible to assume that the white line is drawn to extend in one direction in a range of the image captured by the on-board camera 10. Further, since the white line is line segments, a ratio of a histogram of the white line in the edge direction is larger than that the road surface.

For this reason, a variance in an edge direction of a white line candidate or a ratio or magnitude in a histogram in an edge direction of a white line candidate can be used as information indicating a degree of certainty that a white line candidate represents a white line. Therefore, the white line characteristic calculation portion 40 calculates a variance in an edge direction of a white line candidate, or a ratio or magnitude in a histogram in the edge direction of the white line candidate, sets the certainty factor in accordance with the calculated variance in the edge direction of the white line candidate, the calculated ratio or magnitude in the histogram in the edge direction. The calculated certainty factor is outputted. In the above, the certainty factor is calculated to be larger as the variance in the edge direction of the white line or the ratio or magnitude in the histogram is larger.

(5) A fifth process will be described below. The DSP 70 acting as a road surface characteristic extraction portion 70 extracts pattern or average brightness of a white line candidate itself. When a difference in the pattern or average brightness between a white line candidate and a road surface area is less than or equal to a predetermined value, the certainty factor of the white line candidate is decreased.

Specifically, a road side object such as a guardrail and the like may make a shadow area on a road surface in some cases.

For example, horizontal direct sunlight passing through openings of a guardrail may be reflected on a road surface and it may appear as a white line. In another case, an area surrounded by a repair site, e.g., a black coal tar site, may appear as a straight line shape In order to distinguish the shadow area on a road or the area surrounded by a road repair site from a white line, it may be sufficient to compare pattern or average brightness (mean brightness) of the area with that of a white line. For this reason, when a difference in pattern between a white line candidate and an area extracted by the road surface characteristic extraction portion 70 is large, it is determined that the white line candidate and the area are different, and the certainty factor of the white line candidate is increased. When a difference in average brightness between the white line candidate and the area extracted by the road surface characteristic extraction portion 70 is small, it is determined that the white line candidate and the area are not different, and the certainty factor of the white line candidate is decreased.

(6) A sixth process will be described below. In the sixth process, a certainty factor of a white line candidate is decreased when a total edge amount difference between a white line candidate and a road surface area is less than or equal to a predetermined value. The total edge amount difference may be extracted by an edge characteristic extraction portion 80 (DSP 80).

Even when the fading of a white line reduces a difference in brightness between the white line and a road surface, human eyes see it as a white-line like stains. This is because such stains are highlighted according to human sense when there is no pattern on a road.

When a difference in total edge amount between a white line candidate and an area surrounded by a white line candidate, extracted by the edge characteristic extraction portion 80, is less than or equal to a predetermined value, the certainty factor of the white line candidate is decreased.

(7) A seventh process will be described below. In the seventh process, the certainty factor is decreased when a stripe pattern is detected by a stripe pattern detection portion 90 (the DSP 90).

Some roads have thereon longitudinal stripes (longitudinal grooves) to prevent a vehicle from skidding. In such a case, brightness of longitudinal stripe may be smaller (i.e., darker) than that of a road surface and may be comparable to that of an edge of a white line. Therefore, if a stripe pattern detection portion 90 detects a stripe pattern on a white line candidate, the certainty factor of the white line candidate is decreased.

(8) An eighth process will be described. In the eight process, when a traffic sign detection portion 100 (DSP 100) detects a traffic sign, the certainty factor is decreased.

In addition to white lines, a variety of traffic signs such as a crosswalk mark, an arrow mark, a speed limit mark, a stop mark (e.g., "STOP") and like are painted on roads. When the traffic sign detection portion 100 detects a traffic sign and the like at a white line candidate, the certainty factor of the white line candidate is decreased.

(9) A ninth process will be described. In the ninth process, when a pair white line candidates detection portion 110 (DSP 110) detects a pair of white line candidates located on both sides of the vehicle along a vehicle travel direction, the certainty factor of a white line candidate located between the detected pair of white line candidates is decreased.

When a vehicle is traveling on a road, white lines may exist on both sides of the traveling vehicle along a vehicle travel direction. Therefore, from multiple white line candidates, the pair white line candidate detection portion 110 may detect a pair of white line candidates located on both sides of the vehicle along a vehicle travel direction. If the pair of white line candidates is detected, the certainty factors of the pairs of white lines are increased.

For each white line candidate, the DSP 50 performs a combine process to combine, by multiplication, respective certainty factors that are calculated and outputted at the first to ninth processes (1) to (9). Thereby, the DSP 50 outputs a likelihood indicating a degree of certainty that the white line candidate represents a white line. The DSP 50 is referred to as a white line characteristics combine portion 50.

In the combine process, the white line characteristics combine portion 50 performs multiplication of the certainty factors based on a Bayes' estimation framework. For example, when the white line characteristics calculation portion 40 calculates the certainty factor "A" to be 0.6 and the certainty factor "B" to be 0.7 by performing two of the first to ninth processes (1) to (9), the likelihood given from a combination of the certainty factor "A" and the certainty factor "B" is $(0.6 \times 0.7)/(0.6 \times 0.7 + 0.4 \times 0.4) = 0.78$ for instance.

In the above, respective numerical values (0.4 and 0.3) indicate extents (1-0.6, 1-0.7) to which the white line candidate does not appear as a white line. It should be noted that even if the white line characteristics calculation portion 40 further performs other processes in addition to the above-described processes (1) to (9), only an increase in the number of certainty factors inputted to the white line characteristics combine portion 50 may be a resultant change in content of the combine process. No substantial change in the combine process may be required. That is, the combine process has scalability. This facilitates addition and deletion of processes and enables the calculation of the likelihood with high accuracy and high robustness.

The DSP 60 selects a white line candidate having a largest likelihood from among white line candidates outputted from the white line characteristics combine portion 50, so that the white line candidate having the largest likelihood is selected as a white line on a road. The DSP 60 is referred to as a white line selection portion 60.

The white line characteristics combine portion 50 outputs a likelihood, into which degrees of white line candidate resemblance are combined. The white line selection portion 60 selects a white line candidate having the largest likelihood as a white line on a road.

From the image captured by the on-board camera 10, the DSP 70 extracts a characteristic on a road. The characteristic on a road may be pattern or average brightness of an area between the white line candidates extracted by the white line candidate extraction portion 30, pattern or average brightness of a white line candidate itself, or the like. The DSP 70 is also referred to as a road surface characteristic extraction portion 70.

For example, in some cases, horizontal direct sun light passing through a gap of a guardrail may be reflected on a road surface and a reflecting area may appear as a white-line like liner shape object. In another case, an area surrounded by a trace of repair by cool tar may appears as a liner shape object. In view of these, the pattern of the area and the pattern of the white line candidate are extracted based on pattern matching, a brightness difference or the like.

From the image captured by the on-board camera 10, the DSP 80 extracts a total edge amount in an area between the white line candidates extracted by the white line candidate extraction portion 30. Further, the DSP 80 extracts a total edge amount in the white line candidate itself. The DSP 80 is also referred to as an edge characteristic extraction portion 80.

The total edge amount can be obtained in such manner that: edges are extracted from a binary image; which is obtained by binarization of the image captured by the on-board camera 10; and extracted edges are counted.

From the image captured by the on-board camera 10, the DSP 90 may detect a stripe pattern of an area that has a total edge amount greater than or equal to a predetermined value and that is located in the vicinity of the white line candidate in a direction generally perpendicular to the vehicle travel direction. The DSP 90 is referred to as a stripe pattern detection portion 90.

A longitudinal stripe, which is formed on a road to prevent vehicle skid, has a smaller (darker) brightness as compared with a road surface. However, brightness of a longitudinal stripe edge may be comparable to that of a white line edge in some cases. In view of this, the edge amount is calculated from the binarized image, which is obtained from the image captured by the on-board camera 10. If the area having a total edge amount greater than or equal to the predetermined value is located in the vicinity of the white line candidate (extracted by the white line candidate extraction portion 30) in a direction generally perpendicular to the vehicle travel direction, this is detected as a stripe pattern.

The DSP 100 detects a traffic sign painted on a road from an image captured by the on-board camera 10. The DSP 100 is also referred to as a traffic sign detection portion 100. The traffic sign detection portion 100 detects a traffic sign by pattern matching. The traffic signs to be detected include an arrow mark, a speed limit mark, a stop mark, and a crosswalk mark.

The DSP 110 detects whether the white line candidates extracted by the white line candidate extraction portion 30 include a pair of white line candidates located on both sides of a vehicle along a vehicle travel direction. The DSP 110 is also referred to as a pair white line candidate detection portion 110.

When a vehicle is traveling on a road, white lines may exist on both sides of the traveling vehicle along a vehicle travel direction. In view of this, from white line candidates extracted by the white line candidate extraction portion 30, the pair white line candidate detection portion 110 detects a pair of white line candidates on both sides of the vehicle along the vehicle travel direction based on relative positions of the white line candidates with respect to the vehicle.

2. Advantage of In-Vehicle White Line Recognition Apparatus (i) As described above, the in-vehicle white line recognition apparatus 1 is configured to decrease the certainty factor of the first white line candidate when the first and second white line candidates satisfy a predetermined condition that the first and second white line candidates are within a predetermined range and a ratio of contrast of the first white line candidate to contrast of the second white line candidate is less than a predetermined value.

Figure 6A:
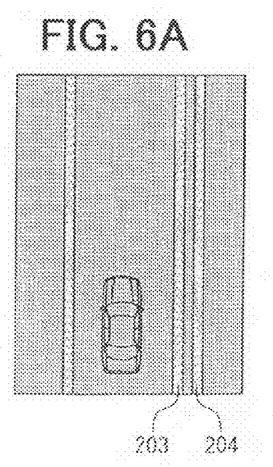
FIG. 6A is a diagram illustrating a situation where there are two true white lines on a road.
Figure 6B:
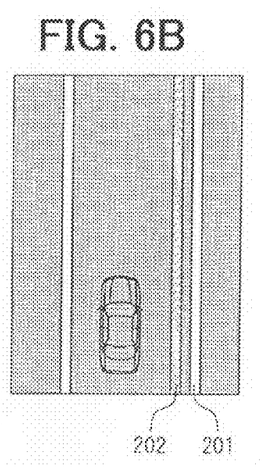
FIG. 6B is a diagram illustrating a situation where there are a true white line and an erasure trace on a road.

According to the above configuration, as shown in FIG. 6B for example, when an erased white line trace 202 exists in the vicinity of a white line 201, and when contrast of the erased white line trace 202 is remarkably smaller than contrast of the white line 201, the in-vehicle white line recognition apparatus 1 can decrease the certainty factor of a white line candidate corresponding to the erased white line 202, and thereby can prevent the erased white line trace 202 from being misidentified as a white line.

Moreover, as shown in FIG. 6A, when true white lines 203 and 204 are located next to each other, and when a ratio of contrast between the white lines 203 and 204 is greater than or equal to 50%, the in-vehicle white line recognition apparatus 1 can correctly recognize the white lines 203 and 204 without decreasing respective certainty factors of the white lines 203 and 204.

Figure 6C:
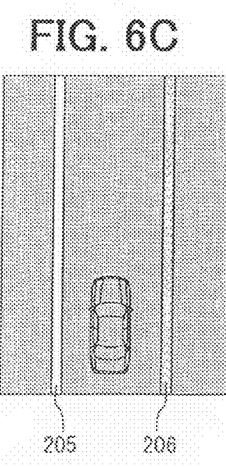
FIG. 6C is a diagram illustrating a situation where there are true white lines on both sides of a vehicle.

Moreover, as shown in FIG. 6C for example, when white lines 205 and 206 are spaced apart from each other by a large distance (i.e., by a predetermined distance or more) and are not within a predetermined range, the in-vehicle white line recognition apparatus 1 can correctly recognize the white lines 205 and 206 without decreasing respective certainty factors of the white lines 205 and 206 even if the ratio of contrast between white line candidates is less than or equal to 50%.

Figure 7:
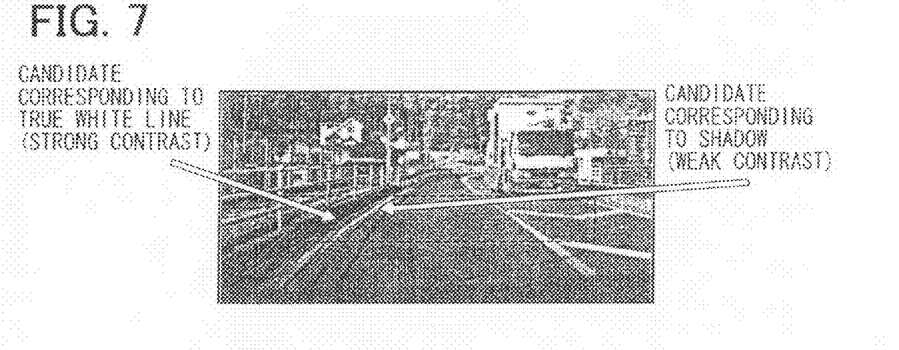
FIG. 7 is a diagram illustrating an image containing a white line candidate corresponding to a shadow on a road.

Moreover, as shown in FIG. 7 for example, when a white line candidate corresponding to a shadow exists in the vicinity of a white line candidate corresponding to a true white line, the in-vehicle white line recognition apparatus 1 can decrease the certainty factor of the white line candidate corresponding to the shadow, and can prevent the shadow from being misidentified as a white line.

Figure 8:
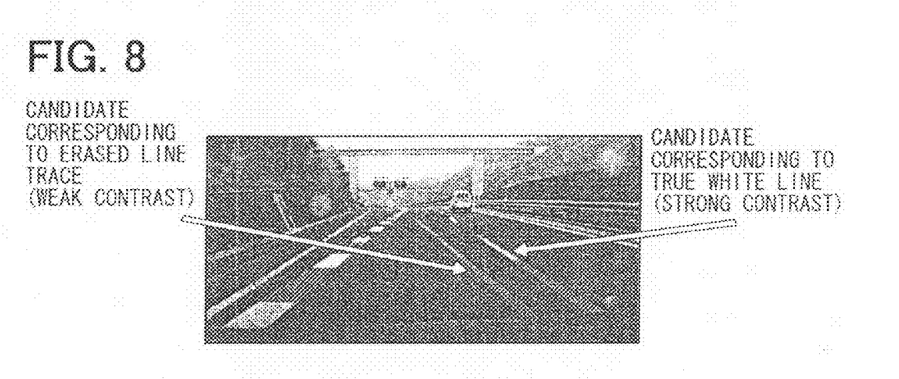
FIG. 8 is a diagram illustrating an image containing a white line candidate corresponding to an erasure trace on a road.

As shown in FIG. 8, when a white line candidate corresponding to an erased line trace exists in the vicinity of a white line candidate corresponding to a true white line, the in-vehicle white line recognition apparatus 1 can decrease the certainty factor of the white line candidate corresponding to the erased line trace, and can prevent the erased line trace from being misidentified as a white line.

Figure 9:
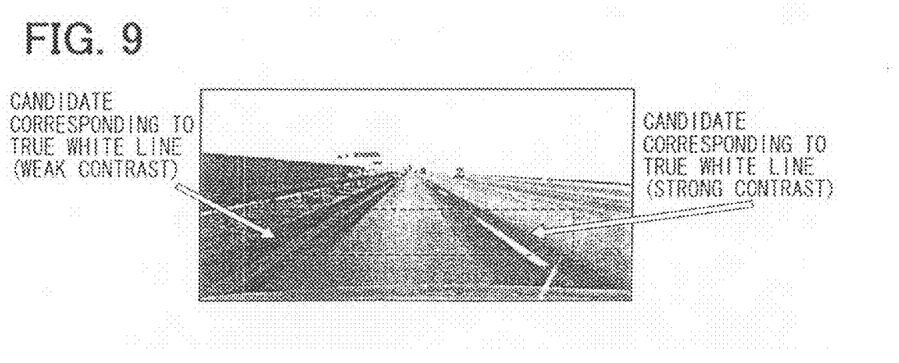
FIG. 9 is a diagram illustrating an image containing two white line candidates on both sides of the vehicle, the two white line candidates corresponding to two true white lines.

As shown in FIG. 9, when white line candidates are spaced apart by a large distance (i.e., by a predetermined distance or more), the in-vehicle white line recognition apparatus 1 does not decrease the certainty factors of the white line candidates even if a ratio of contrast between the white line candidates is less than or equal to 50%. In this way, even when a true white line is faint, the in-vehicle white line recognition apparatus 1 can recognize the faint white line.

(ii) The in-vehicle white line recognition apparatus 1 calculates a likelihood of each white line candidate by combining multiple types of certainty factor. Therefore, no matter what type of certainty factor the white line characteristic calculation portion 40 calculates, in other words no matter what is content of processes of the white line characteristic calculation portion 40, it is possible to easily calculate the likelihood by combining certainty factors and it is possible to select a white line candidate based on the likelihood.

Therefore, even if the white line characteristic calculation portion 40 is improved or even if a process for a new function is further added to the white line characteristic calculation portion 40, it is possible to easily integrate multiple processes.

(iii) The in-vehicle white line recognition apparatus 1 can calculate a certainty factor based on a ratio of contrast of a white line candidate with respect to a road (excluding a portion of the road corresponding to the white line candidate). In this configuration, even when a certain white line candidate corresponding to an erased line trace etc. is spaced apart from another white line candidate, the in-vehicle white line recognition apparatus 1 can decrease the certainty factor of the certain white line candidate if the contrast of the certain white line candidate itself is sufficiently small.

(iv). The white line characteristic calculation portion 40 uses at least one of a brightness variance in a white line candidate or an internal edge amount in the white line candidate as a characteristic feature indicating a degree of certainty that the white line candidate represents a white line. Thus, a difference in brightness can be obtained from the brightness variance, and a difference in pattern flatness can be obtained from the internal edge amount.

Specifically, since a certain object such as a guardrail, a damaged or repaired part of a road and the like is typically different in brightness or pattern flatness from a true white line, it is possible to obtain a different between a white line candidate corresponding to the certain object and a white line candidate corresponding to a true white line, and it is possible to more accurately obtain a certainty factor indicating a degree of certainty that a white line candidates represents a white line.

The white line characteristic calculation portion 40 uses a variance in an edge direction of a white line candidate or a peak ratio or a peak magnitude in a histogram in the edge direction of the white line candidate as a characteristic feature indicating a degree of certainty that the white line candidate actually represents a white line.

Therefore, even if a white line on a road is aged and faded or a white line is aged and thin, it is possible to obtain a difference between the white line and the aged line and a difference between the white line and the road surface repair trace based on the variance in the edge direction of the white line or the peak ratio or the peak magnitude in the histogram in the edge direction. It is hence possible to obtain the certainty degree of while line resemblance in a more precise manner.

The in-vehicle white line recognition apparatus 1 includes the road surface characteristic extraction portion 70, which extracts a road surface characteristic from the image captured by the on-board camera 10. The road surface characteristic to be extracted includes pattern or average brightness of a white line candidate itself, pattern or average brightness of a road surface area, which may be an area between white line candidates. When a difference in pattern or average brightness between the white line candidate itself and the road surface area is smaller than a predetermined value, the white line characteristic calculation portion 40 decreases the certainty factor of the white line candidate.

Therefore, when an object different in brightness or pattern from a true white line, such as a shadow made by a guardrail on a road side or a road surface repair trace, exists on a road, the in-vehicle white line recognition apparatus 1 can decrease the certainty factor of a white line candidate corresponding to such objects. Therefore, it is possible to enhance accuracy of white line recognition.

The in-vehicle white line recognition apparatus 1 includes the edge characteristic extraction portion 80. From the image captured by the on-board camera 10, the edge characteristic extraction portion 80 extracts a total edge amount in a white line candidate itself or a total edge amount in a road surface area, which may be an area between the white line candidates. When a difference in the total edge amount between the white line candidate and the road surface area is less than or equal to a predetermined value, the white line characteristic calculation portion 40 decreases the certainty factor of the white line candidate.

Therefore, even when the white line is aged, the certainty factor of a white line candidate corresponding to the aged white line is not decreased.

Moreover, the in-vehicle white line recognition apparatus 1 includes the stripe pattern detection portion 90 for detecting a stripe pattern from the image captured by the on-board camera 10. The stripe pattern to be detected may be a stripe pattern that has the road brightness larger than a predetermined value in the vehicle travel direction, and that is in area in the vicinity of the white line candidate and in a direction perpendicular to the vehicle travel direction.

When the stripe pattern detection portion 90 detects a stripe pattern (e.g., a groove for skid prevention), the white line characteristic calculation portion 40 decreases a certainty degree of a white line candidate. When a concrete road surface has thereon a longitudinal stripe (e.g., a longitudinal groove) for skid prevention, it is possible to decrease a certainty factor of a white line candidate corresponding to the longitudinal stripe.

Moreover, the in-vehicle white line recognition apparatus 1 includes the traffic sign detection portion 100 for detecting a traffic sign painted on a road from an image captured by the on-board camera 10. When the traffic sign detection portion 100 detects a traffic sign located at a white line candidate, the white line characteristic calculation portion 40 decreases a certainty factor of the white line candidate. Therefore, it is possible to decrease a certainty factor of a white line candidate corresponding to a traffic sign painted on a road.

Moreover, the in-vehicle white line recognition apparatus 1 includes the pair white line candidate detection portion 110 for detecting whether white line candidates extracted by the white line candidate extraction portion 30 include a pair of white line candidates located on both sides (i.e., right side and left side) of the vehicle along the vehicle travel direction. When the pair white line candidate detection portion 110 detects the presence of the pair of white line candidates located on both sides of the vehicle along the vehicle travel direction, the white line characteristic calculation portion 40 decreases a certainty factor of a white line candidate located in an area between the pair of white line candidates.

Therefore, it is possible to decrease, certainty factor of a white line candidate (e.g., an erased white line trace, a line at a middle of one traffic lane) existing in an area between the pair of white line candidate located on both sides of the vehicle.

(Modifications)

Embodiments of the present invention are not limited to the above embodiments. The above embodiments can be modified in various ways, examples of which are described below.

In the above embodiment, various processes are assigned to and performed by multiple DSPs, respectively. Alternatively, the various processes may not be assigned to multiple DSPs but may be performed by a single CPU.

In the above embodiment, the white line characteristic calculation portion 40 is configured as a single DSP. Alternatively, the white line characteristic calculation portion 40 may be configured such that multiple internal processes of the white line characteristic calculation portion 40 as shown in FIG. 3 are assigned to multiple DSPs. In this configuration, higher-speed processing is possible.

The white line characteristic calculation portion 40 may perform the following process (A) or (B) in place of any one of the above first to ninth processes (1) to (9) or in addition to the above first to ninth processes (1) to (9). The process (A) relates a total length of a white line candidate. In the process (A), the certainty factor of the white line candidate is calculated to be larger as length of the white line candidate in its longitudinal direction is longer. The process (B) relates to a combination line pattern. In the process (B), it is determined based on pattern matching whether multiple white line candidates form a combination line pattern. When it is determined that the multiple white line candidates form a combination line pattern, the certainty factor of one white line candidate located at a center of the combination line pattern is increased, and the certainty factor of the other white line candidate is decreased.

In the above embodiments and modifications, the white line characteristic calculation portion 40 can act as at least one certainty factor calculation section or means that is configured to calculate a certainty factor of each white line candidate. The white line characteristic calculation portion 40 may act multiple certainty factor calculation sections or means each calculating the certainty factor. For example, the multiple certainty factor calculation sections or means may correspond to the above-described first to ninth processes ((1) to (9)), respectively. The white line characteristics combine portion 50 and the white line selection section 60 can act as a white line selection section or means configured to select, based on the calculated certainty factors, the white line to be recognized. The white line selection section or means may calculate a likelihood of each white line candidate through multiplication of the certainty factors that are calculated for the each white line candidate, and may select one white line candidate having a largest likelihood from the multiple white line candidates.

While the invention has been described above with reference to various embodiments thereof, it is to be understood that the invention is not limited to the above described embodiments and constructions. The invention is intended to cover various modifications and equivalent arrangements.

Further, each or any combination of processes, steps, portions or means explained in the above may be achieved as a software section or means (e.g., subroutine) and/or a hardware section or means (e.g., circuit or integrated circuit), including or not including a function of a related device; furthermore, the hardware section or means can be constructed inside of a microcomputer.

Furthermore, the software section or means or any combinations of multiple software sections or means may be included in a software program, which is contained in a computer-readable storage media or is installed in a computer via a communications network.

What is claimed is:

1. An in-vehicle white line recognition apparatus for recognizing a white line, comprising:
    an on-board camera configured to capture an image of a surrounding of a vehicle;
    a white line candidate extraction section configured to perform image processing on the captured image to extract a plurality of white line candidates from the captured image, the plurality of white line candidates including a first white line candidate and a second white line candidate;
    at least one certainty factor calculation section configured to calculate a certainty factor of each white line candidate, the certainty factor indicating a degree of certainty that the each white line candidate represents the white line; and
    a white line selection section configured to select the white line to be recognized, based on the calculated certainty factors,
    wherein:
    when the first white line candidate and the second white line candidate satisfy a predetermined condition that (i) the first white line candidate and the second white line candidate are within a predetermined range and (ii) a ratio of contrast of the first white line candidate to contrast of the second white line candidate is less than a predetermined value, the certainty factor calculation section decreases the certainty factor of the first white line candidate as compared with when the first white line candidate and the second white line candidate do not satisfy the predetermined condition;
    the at least one certainty factor calculation section is a plurality of certainty factor calculation sections each calculating the certainty factor;
    the white line selection section calculates a likelihood of each white line candidate through multiplication of the certainty factors that are respectively calculated for the each white line candidate by the plurality of certainty factor calculation sections;
    the white line selection section selects one white line candidate having a largest likelihood from the plurality of white line candidates; and
    one of the plurality of certainty factor calculation sections is configured to calculate the certainty factor of each white line candidate, based on a contrast ratio of the each white line candidate with respect to a road, the road excluding a portion of the road corresponding to the each white line candidate.

* * * * *